US012811656B2

(12) United States Patent
Li

(10) Patent No.: US 12,811,656 B2
(45) Date of Patent: Nov. 24, 2026

(54) METHOD AND APPARATUS FOR DETERMINING DEFAULT BEAM, USER EQUIPMENT, AND NETWORK DEVICE

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 513 days.

(21) Appl. No.: 18/260,129

(22) PCT Filed: Jan. 4, 2021

(86) PCT No.: PCT/CN2021/070181

§ 371 (c)(1),
(2) Date: Jun. 30, 2023

(87) PCT Pub. No.: WO2022/141641

PCT Pub. Date: Jul. 7, 2022

(65) Prior Publication Data

US 2024/0063878 A1 Feb. 22, 2024

(51) Int. Cl.

| | |
|---|---|
| ***H04B 7/06*** | (2006.01) |
| ***H04W 72/12*** | (2023.01) |
| ***H04W 72/232*** | (2023.01) |
| ***H04W 76/20*** | (2018.01) |

(52) U.S. Cl.

CPC .......... *H04B 7/0695* (2013.01); *H04W 72/12* (2013.01); *H04W 72/232* (2023.01); *H04W 76/20* (2018.02)

(58) Field of Classification Search

CPC .. H04B 7/0695; H04W 72/12; H04W 72/232; H04W 76/20

See application file for complete search history.

(56) References Cited

U.S. PATENT DOCUMENTS

| | | | | |
|---|---|---|---|---|
| 2020/0053767 | A1* | 2/2020 | Bai | H04W 72/23 |
| 2020/0260300 | A1* | 8/2020 | Cirik | H04B 7/088 |
| 2020/0337058 | A1* | 10/2020 | Song | H04L 5/0053 |
| 2020/0350957 | A1 | 11/2020 | Zhou et al. | |

FOREIGN PATENT DOCUMENTS

WO WO 2020207374 A1 10/2020

OTHER PUBLICATIONS

"Corrections on multi TRP related issues", vivo, 3GPP TSG RAN WG1 #103-e, R1-2008675, e-Meeting, Oct. 26-Nov. 13, 2020, 14 pages.

"Enhancements on Beam Management for Multi-TRP/Panel Transmission", Nokia, Nokia Shanghai Bell, 3GPP TSG RAN WG1 #102-e, R1-2006846, e-Meeting, Aug. 17-28, 2020, 7 pages.

(Continued)

*Primary Examiner* — Jackie Zuniga Abad

(74) *Attorney, Agent, or Firm* — Finnegan, Henderson, Farabow, Garrett & Dunner, L.L.P.

(57) ABSTRACT

A method for determining a default beam is performed by a user equipment, and includes: determining a default beam corresponding to a first control resource set (CORESET) based on a specified rule, wherein a maximum number of transmission configuration indication (TCI) states supported by the first CORESET is equal to 2.

17 Claims, 4 Drawing Sheets

(56) References Cited

OTHER PUBLICATIONS

Office Action issued by the Korean Patent Office on Jul. 1, 2025, in corresponding Application No. KR 10-2023-7026327, 11 pages.
International Search Report and Written Opinion of International Application No. PCT/CN2021/070181, dated Oct. 8, 2021, 13 pages.
The First Office Action for Chinese Application No. 202180000135.6, dated Jun. 22, 2022, 11 pages.
Zte, Details of latency and overhead reduction for beam management, 3GPP TSG RAN WG1 #96bis, R1-1904022, Xi'an, China, Apr. 8-12, 2019, 5 pages.
European Patent Office, partial supplementary European Search Report issued in Application No. 21912424.5 dated Feb. 15, 2024, 15 pages.
Zte, "Additional details of latency and overhead reduction for beam management," 3GPP TSG RAN WG1 #96, R1-1901640, Athens, Greece, Feb. 25-Mar. 1, 2019, 4 pages.
Notice of Reasons for Refusal for Japanese Application No. 2023-540970, dated Apr. 23, 2024, 6 pages.
Intel Corporation, "Multi-TRP enhancements for beam management," 3GPP TSG RAN WG1 #102-e, R1-2005861, e-Meeting, Aug. 17-28, 2020, 5 pages.
AT&T, "Enhancements on Beam Management for Multi-TRP," 3GPP TSG RAN WG1 #103e, R1-2008308, Oct. 26-Nov. 13, 2020, 7 pages.
Intel Corporation, "Multi-TRP enhancements for PDCCH, PUCCH and PUSCH," 3GPP TSG RAN WG1 #102-e, R1-2005859, e-Meeting, Aug. 17-28, 2020, 13 pages.
Sony, "Considerations on beam management for multi-TRP," 3GPP TSG RAN WG1 #102-e, R1-2005563, E-meeting, Aug. 17-28, 2020, 7 pages.
Zte, "Considerations on beam management for multi-TRP", 3GPP TSG RAN WG1 #96bis, R1-1904021, Xi'an, China, Apr. 8-12, 2019, 7 pages.
Apple Inc., "Remaining Issues on Multi-beam operation", 3GPP TSG RAN WG1 #101, R1-2004230, e-Meeting, May 25-Jun. 5, 2020, 12 pages.
Intel Corporation, "Correction to multi TRP operation", 3GPP TSG RAN WG1 Meeting #100-E, R1-2000739, e-Meeting, Feb. 24-Mar. 6, 2020, 3 pages.
Office Action for Chinese Application No. 202310357913.8, dated Apr. 1, 2026, 20 pages.

* cited by examiner

METHOD AND APPARATUS FOR DETERMINING DEFAULT BEAM, USER EQUIPMENT, AND NETWORK DEVICE

CROSS-REFERENCE TO RELATED APPLICATION

This application is a U.S. national phase application of International Patent Application No. PCT/CN2021/070181, filed on Jan. 4, 2021, the entire contents of which are incorporated herein by reference.

FIELD

The present disclosure relates to the field of wireless communication technologies, and especially to a method for determining a default beam, an apparatus for determining a default beam, a user equipment, a network device, and a storage medium.

BACKGROUND

In a new radio (NR) system, beam-based transmission and reception may be used to ensure coverage due to the rapid attenuation of high-frequency channels. When a network device has a plurality of transmission and reception points (TRPs), the network device may use the plurality of TRPs to provide services for a user equipment, for example, using the plurality of TRPs to send a physical downlink control channel (PDCCH) for the user equipment. When the network device uses a TRP to send a PDCCH for the user equipment, it may configure a control resource set (CORESET) for the user equipment, and configure a transmission configuration indication (TCI) state corresponding to the CORESET. When the network device uses the plurality of TRPs to send a PDCCH for the user equipment, it may configure a plurality of TCI states for the CORESET to indicate beams corresponding to different TRPs, respectively.

In the related art, when a time interval between the PDCCH and a physical downlink shared channel (PDSCH) scheduled by a downlink control information (DCI) signaling carried on the PDCCH is small, the user equipment does not have time to obtain beam indication information in the DCI, or the DCI does not carry a TCI state corresponding to a receiving beam configured to indicate the PDSCH, the user equipment needs to use a default beam to receive the PDSCH scheduled by the DCI. However, in the prior art, methods for determining the default beam are defined for a CORESET sending DCI corresponding to a TCI state. When the CORESET sending the DCI corresponds to the plurality of TCI states, the default beam corresponding to the CORESET cannot be determined.

SUMMARY

An embodiment of the present disclosure provides a method for determining a default beam, which is performed by a user equipment. The method for determining the default beam includes determining a default beam corresponding to a first control resource set (CORESET) based on a specified rule, in which a maximum number of transmission configuration indication (TCI) states supported by the first CORESET is greater than or equal to 2.

Another embodiment of the present disclosure provides a method for determining a default beam, which is performed by a network device. The method for determining the default beam includes determining a default beam corresponding to a first control resource set (CORESET) based on a specified rule, in which a maximum number of transmission configuration indication (TCI) states supported by the first CORESET is greater than or equal to 2.

Another embodiment of the present disclosure provides a user equipment. The user equipment includes a transceiver, a memory, and a processor connected to the transceiver and the memory, respectively, and configured to control wireless signal transmission and reception of the transceiver and perform following operations by executing computer-executable instructions on the memory determining a default beam corresponding to a first control resource set (CORESET) based on a specified rule, in which a maximum number of transmission configuration indication (TCI) states supported by the first CORESET is greater than or equal to 2.

BRIEF DESCRIPTION OF THE DRAWINGS

Example embodiments will be described in detail below in conjunction with the accompanying drawings.

DETAILED DESCRIPTION

Figure 1:
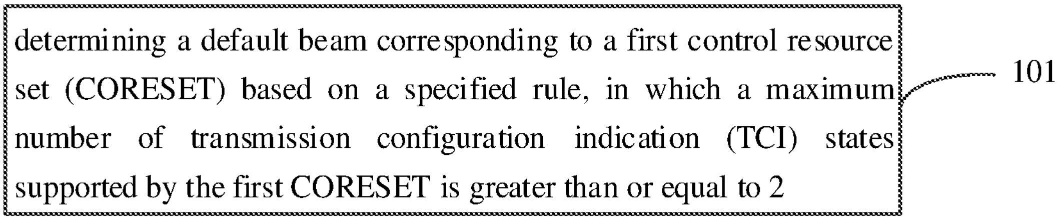
FIG. 1 is a flow chart showing a method for determining a default beam provided in an embodiment of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

Terms used herein in embodiments of the present disclosure are merely for the purpose of describing specific embodiments, but should not be construed to limit the present disclosure. As used in the embodiments of the present disclosure and the appended claims, "a/an" and "the" in singular forms are intended to include plural forms, unless clearly indicated in the context otherwise. It should also be understood that, the term "and/or" used herein represents and contains any or all possible combinations of one or more associated listed items.

It is to be understood that, although terms such as "first," "second" and "third" may be used in embodiments of the present disclosure for describing various information, these information should not be limited by these terms. These terms are merely configured for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

Embodiments of the present disclosure are described in detail below, examples of which are illustrated in the accompanying drawings. The same or similar reference numerals represent the same or similar elements throughout the descriptions. The embodiments described below with reference to the accompanying drawings are illustrative, are intended to explain the present disclosure and cannot be construed as limiting the present disclosure.

A method for determining a default beam, an apparatus for determining a default beam, a user equipment, a network device, and a storage medium provided in the present disclosure are used for solving the problem that in the related art, when a CORESET sending a DCI corresponds to a plurality of TCI states, a default beam corresponding to the CORESET cannot be determined.

With regard to the problem in the related art that when a CORESET sending a DCI corresponds to a plurality of TCI states, a default beam corresponding to the CORESET cannot be determined, an embodiment of the present disclosure provides a method for determining a default beam.

In the method for determining the default beam provided in the embodiment of the present disclosure, a default beam corresponding to a first control resource set (CORESET) is determined based on a specified rule, in which a maximum number of transmission configuration indication (TCI) states supported by the first CORESET is greater than or equal to 2. Therefore, the default beam corresponding to the CORESET supporting the plurality of TCI states is determined by means of a predefined specified rule, thus improving the accuracy of determining the default beam for the CORESET corresponding to the plurality of TCI states, and increasing the reliability of multi-TRP data transmission.

A method for determining a default beam, an apparatus for determining a default beam, a user equipment, a network device, and a storage medium provided in the present disclosure are described in detail with reference to the accompanying drawings.

FIG. 1 is a flow chart showing a method for determining a default beam provided in an embodiment of the present disclosure, which is performed by a user equipment.

As shown in FIG. 1, the method for determining the default beam includes a step as follows.

In step 101, a default beam corresponding to a first control resource set (CORESET) is determined based on a specified rule, in which a maximum number of transmission configuration indication (TCI) states supported by the first CORESET is greater than or equal to 2.

It is to be noted that the method for determining the default beam in the embodiment of the present disclosure may be applied to any user equipment. The user equipment may be a device that provides voice and/or data connectivity to a user. The user equipment may communicate with one or more core networks via a radio access network (RAN). A terminal may be an Internet of Things terminal, such as a sensor device, a mobile phone (or referred to as a "cellular" phone) and a computer with an Internet of Things terminal. For example, it can be a fixed, portable, pocket-sized, handheld, computer built-in or vehicle-mounted apparatus. For example, it is a station (STA), a subscriber unit, a subscriber station, a mobile station, a mobile, a remote station, an access point, a remote terminal, an access terminal, a user terminal or a user agent. Alternatively, the user equipment may also be a device of an unmanned aerial vehicle. Alternatively, the user equipment may also be a vehicle-mounted device, for example, an in-vehicle computer with a wireless communication function, or a wireless terminal externally connected with an in-vehicle computer. Alternatively, the user equipment may also be a roadside device, such as a street lamp, a signal lamp or other roadside devices with a wireless communication function.

It is to be noted that application scenarios of the method for determining the default beam in an embodiment of the present disclosure may include a scenario where the default beam is determined for a CORESET that may configure a plurality of TCI states. The TCI state is a beam, and one TCI state may correspond to one beam.

The first CORESET may refer to a CORESET that may support the plurality of TCI states. It is to be noted that although the first CORESET may support the plurality of TCI states, one TCI state may also be configured for the first CORESET at certain moments according to actual service requirements, which is not limited in the embodiment of the present disclosure.

As an example, the first CORESET may be a CORESET that may support two TCI states. It is to be noted that the following contents of the present disclosure are specifically described by taking the first CORESET as the CORESET that may support the two TCI states.

In an implementation, a medium access control control element (MAC CE) signaling may be used as a beam indication signaling of the CORESET, so that the default beam corresponding to the first CORESET may be determined through the MAC CE signaling. That is, in an implementation of the embodiment of the present disclosure, the above step 101 may include receiving a medium access control control element (MAC CE), in which the MAC CE is configured to activate a first beam corresponding to the first CORESET, and determining the first beam as the default beam corresponding to the first CORESET.

In an embodiment of the present disclosure, the network device may determine the number of beams that may be activated for the first CORESET according to the number of self-contained TRPs and current service requirements, and activate a corresponding number of first beams through the MAC CE, so that the user equipment may determine the activated first beam corresponding to the first CORESET according to a received MAC CE, and the first beam is determined as the default beam corresponding to the first CORESET.

For example, it is determined that the network device includes 2 TRPs, and the network device may determine that the number of the first beams may be 1 or 2, so that the network device may activate one first beam for the first CORESET or two first beams for the first CORESET by sending the MAC CE to the user device. It is to be noted that when the two first beams are activated for the first CORE- SET, each first beam corresponds to a different TRP. The TRPs may be distinguished by at least one of TRP identifiers, control resource set pool indexes (CORESETPoolIndexes), reference signal resource identifiers, reference signal resource set identifiers, panel IDs, and the like.

It is to be noted that when determining the default beam corresponding to the first CORESET according to the first beam, the user equipment may determine a corresponding first beam as the default beam corresponding to the first CORESET according to the number of the first beams and the number of preset default beams. Additionally, it may be divided into the following three cases.

Case 1

The number of the first beams is one, and the one first beam is determined as the default beam corresponding to the first CORESET.

In an implementation, in response to determining that the number of the first beams is one, the user equipment may directly determine the first beam activated by the MAC CE for the first CORESET as the default beam corresponding to the first CORESET.

Case 2

The number of the first beams is two, and the two first beams are determined as the default beams corresponding to the first CORESET.

In an implementation, in response to determining that the number of the first beams is two, and the number of default beams pre-agreed between the network device and the user equipment is two, or the number of default beams is not pre-agreed, the user equipment may directly determine the two first beams activated by the MAC CE for the first CORESET as the default beams corresponding to the first CORESET.

Case 3

The number of the first beams is two, and one of the two first beams corresponding to a specified transmission and reception point (TRP) is determined as the default beam corresponding to the first CORESET.

In an implementation, the MAC CE may contain a plurality of bits configured to activate TCI states of different TRPs, respectively. The user equipment may know which TRP's TCI state each bit in the MAC CE is used to activate. Therefore, in response to determining that the number of the first beams is two, and the network device and the user equipment pre-agree on a specified TRP, the user equipment may determine a first beam corresponding to the specified TRP in the two first beams according to a correspondence between the bit in the MAC CE and the TRP, and the first beam corresponding to the specified TRP is determined as the default beam corresponding to the first CORESET.

For example, in case that one of the two first beams corresponds to TRP #0 (or a TRP corresponding to CORESETPoolIndex #0) in two TRPs, and the other first beam corresponds to TRP #1 (or a TRP corresponding to CORESETPoolIndex #1) in the two TRPs, the specified TRP may be the TRP #0 (or the TRP corresponding to CORESETPoolIndex #0), and the specified TRP may also be the TRP #1 (or the TRP corresponding to CORESETPoolIndex #1).

In another implementation, the DCI may also be used as a beam indication signaling of the CORESET, so that the default beam corresponding to the first CORESET may be determined through the DCI. That is, in an implementation of the embodiment of the present disclosure, the above step 101 may include receiving first downlink control information (DCI), in which the first DCI is configured to indicate a second beam corresponding to the first CORESET, and determining the second beam as the default beam corresponding to the first CORESET.

In an embodiment of the present disclosure, the network device may also determine the number of beams that may be activated for the first CORESET according to the number of self-contained TRPs and current service requirements, and configure a corresponding number of second beams for the first CORESET by sending the DCI to the user equipment, so that the user equipment may determine the second beam according to a received DCI, and the second beam is determined as the default beam corresponding to the CORESET.

It is to be noted that a TCI status field configured to indicate a beam in the DCI is a plurality of bits (for example, 3 bits). The plurality of bits may be displayed as a plurality of different code points at different moments, such as '000', '001', '010', '011', '100', '101', '110', and '111'. Each code point may correspond to a group of second beams, in which each group of second beams may include one second beam or two second beams.

As an example, a correspondence between the code point and each group of second beams may be indicated by the MAC CE. That is, a plurality of second beams may be activated by the MAC CE, and each bit in the MAC CE is in one-to-one correspondence to the two second beams corresponding to each code point, respectively. However, merely one second beam of the two second beams corresponding to each code point may exist and is indicated by bit information in the MAC CE. When both the two second beams corresponding to each code point exist, the two second beams correspond to different TRPs, respectively.

It is to be noted that when determining the default beam corresponding to the first CORESET according to the second beam, the user equipment may determine the corresponding second beam as the default beam corresponding to the first CORESET according to the number of the second beams corresponding to each code point in the DCI and the number of preset default beams. Additionally, it may be divided into the following four cases.

Case 1

At least one of the second beams is determined as the default beam corresponding to the first CORESET.

In an implementation, in response to determining that the number of second beams is one, that is, the DCI indicates that a beam corresponding to the first CORESET is one beam, the user equipment may directly determine one second beam indicated by the DCI as the default beam corresponding to the first CORESET.

In another implementation, in response to determining that the number of second beams is two, that is, the DCI indicates that beams corresponding to the first CORESET are two beams, and indicates that the default beam corresponding to the first CORESET is one beam, the user equipment may determine any one of the two second beams as the default beam corresponding to the first CORESET.

In yet another implementation, in response to determining that the number of second beams is two, that is, the DCI indicates that beams corresponding to the first CORESET are two beams, and indicates that the default beams corresponding to the first CORESET are two beams, the user equipment may determine the two second beams indicated by the DCI as the default beams corresponding to the first CORESET.

Case 2

A second beam corresponding to a code point with a minimum value configured to indicate one second beam in the first DCI is determined as the default beam corresponding to the first CORESET.

In an implementation, since each code point in the DCI may correspond to a group of second beams, the user equipment may determine a second beam corresponding to one of the code points as the default beam corresponding to the first CORESET. Therefore, in response to determining that the DCI indicates that the default beam corresponding to the first CORESET is one beam, the user equipment may first select code points corresponding to one second beam in the DCI, and one second beam corresponding to a selected code point with a minimum value is determined as the default beam corresponding to the first CORESET.

For example, each code point in the DCI may be represented by 3 bits. For example, values of the code point may include 000, 001, 010, 011, 100, 101, 110, 111, and so on, and the above values are arranged in an ascending order. For example, it is determined that a code point "011" in the DCI corresponds to one second beam, and a code point "000" also indicates one second beam, one second beam indicated by the code point "000" may be determined as the default beam corresponding to the first CORESET.

Case 3

Two second beams corresponding to a code point with a minimum value configured to indicate the two second beams in the first DCI are determined as the default beams corresponding to the first CORESET.

In an implementation, since each code point in the DCI may correspond to a group of second beams, the user equipment may determine a second beam corresponding to one of the code points as the default beam corresponding to the first CORESET. Therefore, in response to determining that the DCI indicates that default beams corresponding to the first CORESET are two beams, the user equipment may first select code points corresponding to two second beams in the DCI, and two second beams corresponding to a selected code point with a minimum value are determined as the default beams corresponding to the first CORESET.

For example, it is determined that a code point "011" in the DCI corresponds to two second beams, and a code point "000" also indicates two second beams, the two second beams indicated by the code point "000" may be determined as the default beams corresponding to the first CORESET.

Case 4

One second beam corresponding to a specified TRP in two second beams is determined as the default beam corresponding to the first CORESET, the two second beams corresponding to a code point with a minimum value configured to indicate the two second beams in the first DCI.

In an implementation, since each code point in the DCI may correspond to a group of second beams, the user equipment may determine a second beam corresponding to one of the code points as the default beam corresponding to the first CORESET. Therefore, in response to determining that the DCI indicates that beams corresponding to the first CORESET are two beams, and indicates that the default beam corresponding to the first CORESET is one beam, and the network device and the user equipment pre-agree on a specified TRP, the user equipment may first select code points corresponding to the two second beams in the DCI, and determine a second beam corresponding to the specified TRP in the two second beams corresponding to the selected code point with the minimum value according to a correspondence between each bit in the MAC CE and the TRP, and the second beam corresponding to the specified TRP is determined as the default beam corresponding to the first CORESET.

For example, a code point "011" in the DCI corresponds to two second beams, and a code point "000" also indicates two second beams, and the two second beams indicated by "000" are TCI #0 and TCI #1, respectively. The TCI #0 corresponds to TRP #0 (or a TRP corresponding to CORESETPoolIndex #0). The TCI #1 corresponds to TRP #1 (or a TRP corresponding to CORESETPoolIndex #1). In case that the specified TRP is the TRP #0 (or the TRP corresponding to CORESETPoolIndex #0), the TCI #0 is determined as the default beam corresponding to the first CORESET. In case that the specified TRP is the TRP #1 (or the TRP corresponding to CORESETPoolIndex #1), the TCI #1 is determined as the default beam corresponding to the first CORESET.

In an embodiment of the present disclosure, the MAC CE may be a MAC CE indicating a dedicated beam of the first CORESET, or the MAC CE may also be a MAC CE indicating a common beam of a group including the first CORESET.

In addition to the first CORESET, the group may also include at least one of other CORESETs, a PDSCH, a physical uplink shared channel (PUSCH), a physical uplink control channel (PUCCH), a channel state information reference signal (CSI-RS), a sounding reference signal (SRS), a positioning reference signal (PRS), a demodulation reference signal (DMRS), and the like.

It is to be noted that the dedicated beam may refer to a beam that is merely configured for the first CORESET. The common beam may refer to a beam that may be configured for at least one group of channels and/or at least one reference signal. That is, in addition to the first CORESET, the common beam may be configured for other CORESETs, PDSCHs, PUSCHs, reference signals, and the like belonging to the same group as the first CORESET.

In the method for determining the default beam provided in the embodiment of the present disclosure, the default beam corresponding to the first CORESET is determined based on the specified rule, in which the maximum number of TCI states supported by the first CORESET is greater than or equal to 2. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

Another method for determining a default beam provided in an embodiment of the present disclosure is further described below with reference to FIG. 2.

Figure 2:
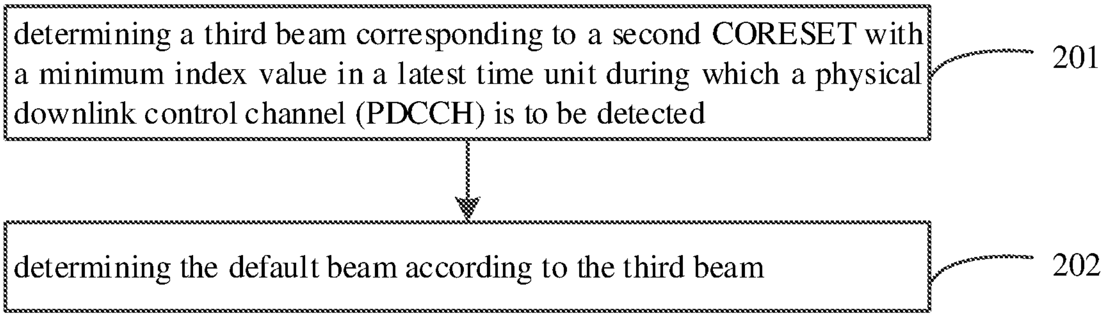
FIG. 2 is a flow chart showing another method for determining a default beam provided in an embodiment of the present disclosure.

FIG. 2 is a flow chart showing another method for determining a default beam provided in an embodiment of the present disclosure, which is performed by a user equipment.

As shown in FIG. 2, the method for determining the default beam includes steps as follows.

In step 201, a third beam corresponding to a second CORESET with a minimum index value in a latest time unit during which a physical downlink control channel (PDCCH) is to be detected is determined.

The time unit may be any one of a slot, a mini-slot, a transport time interval (TTI), a subframe and an infinite frame, which is not limited in the embodiment of the present disclosure. In an embodiment of the present disclosure, a slot is taken as an example of the time unit for specific description.

In an embodiment of the present disclosure, in response to determining that all CORESETs correspond to a same CORESETPoolIndex, the user equipment may determine a second CORESET with a minimum index value in a latest slot during which a PDCCH is to be detected, and determine the default beam corresponding to the first CORESET according to the third beam corresponding to the second CORESET. In this case, the CORESETPoolIndex corresponding to the first CORESET may be 0, 1, 0 and 1, or values other than 0 and 1, such as 2, 3 and 4.

In step 202, the default beam is determined according to the third beam.

In an embodiment of the present disclosure, when the default beam corresponding to the first CORESET is determined according to the third beam corresponding to the second CORESET, one or more of the third beams may be determined as the default beam corresponding to the first CORESET according to the number of the third beams and current service requirements.

In an implementation, the third beam may be determined as the default beam corresponding to the first CORESET.

Additionally, in response to determining that the network device and the user equipment do not pre-agree on a specified TRP, and the second CORESET may merely configure one beam at most, that is, the number of the third beams is one, the third beam may be determined as the default beam corresponding to the first CORESET.

Additionally, in response to determining that the network device and the user equipment do not pre-agree on a specified TRP, and the second CORESET may configure two beams at most, but merely one beam is configured currently, that is, the number of the third beams is one, the third beam may be determined as the default beam corresponding to the first CORESET.

Additionally, in response to determining that the network device and the user equipment do not pre-agree on a specified TRP, and the second CORESET may configure two beams at most, and two beams are configured currently, that is, the number of the third beams is two, the two third beams may be determined as the default beams corresponding to the first CORESET.

In another implementation, it may also be determined that the default beam corresponding to the first CORESET is one of the third beams corresponding to the specified TRP.

Additionally, in response to determining that the network device and the user equipment pre-agree on a specified TRP, and the second CORESET may configure two beams at most, and two beams are configured currently, that is, the number of the third beams is two, the third beam corresponding to the specified TRP may be determined as the default beam corresponding to the first CORESET.

For example, in case that one of the two third beams, such as TCI #0, corresponds to TRP #0 (or a TRP corresponding to CORESETPoolIndex #0) in two TRPs, and the other third beam, such as TCI #1, corresponds to TRP #1 (or a TRP corresponding to CORESETPoolIndex #1) in the two TRPs, the specified TRP may be the TRP #0 (or the TRP corresponding to CORESETPoolIndex #0), and the specified TRP may also be the TRP #1 (or the TRP corresponding to CORESETPoolIndex #1). In case that the specified TRP is the TRP #0 (or the TRP corresponding to CORESETPoolIndex #0), the TCI #0 is determined as the default beam corresponding to the first CORESET. In case that the specified TRP is the TRP #1 (or the TRP corresponding to CORESETPoolIndex #1), the TCI #1 is determined as the default beam corresponding to the first CORESET.

In an embodiment of the present disclosure, steps 201 to 202 may be implemented in any one of the embodiments of the present disclosure, respectively, which are not limited in the embodiments of the present disclosure, and will not be elaborated herein.

In the method for determining the default beam provided in the embodiment of the present disclosure, the third beam corresponding to the second CORESET with the minimum index value in the latest time unit during which the PDCCH is to be detected is determined, and the default beam is determined according to the third beam. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

Another method for determining a default beam provided in an embodiment of the present disclosure is further described below with reference to FIG. 3.

Figure 3:
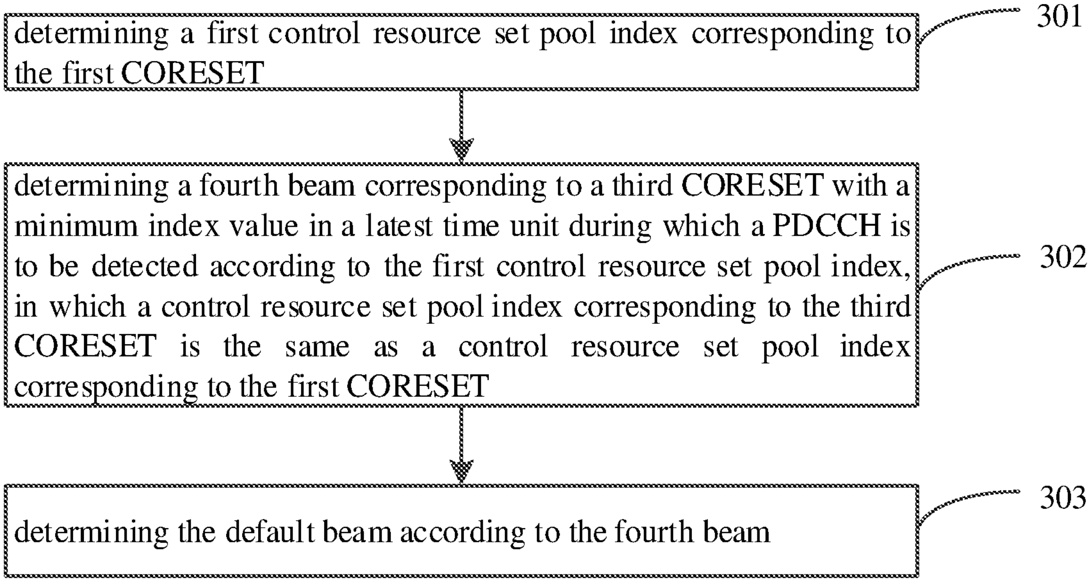
FIG. 3 is a flow chart showing another method for determining a default beam provided in an embodiment of the present disclosure.

FIG. 3 is a flow chart showing another method for determining a default beam provided in an embodiment of the present disclosure, which is performed by a user equipment.

As shown in FIG. 3, the method for determining the default beam includes steps as follows.

In step 301, a first control resource set pool index (CORESETPoolIndex) corresponding to the first CORESET is determined.

In an embodiment of the present disclosure, in response to determining that different CORESETs may correspond to different CORESETPoolIndexs, the user equipment may determine the default beam corresponding to the first CORESET according to a CORESET with the same CORESETPoolIndex as the first CORESETPoolIndex corresponding to the first CORESET. Therefore, the user equipment may first determine the first CORESETPoolIndex corresponding to the first CORESET, so as to determine the CORESET with the same CORESETPoolIndex as the first CORESETPoolIndex of the first CORESE according to the first CORESETPoolIndex.

In an implementation, since the CORESETPoolIndex may be configured to identify the TRP corresponding to the CORESET, the first CORESETPoolIndex corresponding to the first CORESET may be determined according to the TRP corresponding to the first CORESET.

For example, the first CORESET may actually correspond to two TRPs, and in response to the first CORESET corresponding to the first TRP, it may be determined that the first CORESETPoolIndex corresponding to the first CORESET is a first specified value. In response to the first CORESET corresponding to the second TRP, it may be determined that the first CORESETPoolIndex corresponding to the first CORESET is a second specified value. In response to the first CORESET corresponding to both the first TRP and the second TRP, it may be determined that the first CORESETPoolIndex corresponding to the first CORESET is a first specified value and a second specified value, or it may also be determined that the first CORESETPoolIndex corresponding to the first CORESET is a value other than the first specified value and the second specified value. For example, the first specified value may be 0, the second specified value may be 1, and the other values may be 2, which is not limited in the embodiment of the present disclosure.

In step 302, a fourth beam corresponding to a third CORESET with a minimum index value in a latest time unit during which a PDCCH is to be detected is determined according to the first CORESETPoolIndex, in which a CORESETPoolIndex corresponding to the third CORESET is the same as a CORESETPoolIndex corresponding to the first CORESET.

In an embodiment of the present disclosure, after determining the first CORESETPoolIndex corresponding to the first CORESET, the user equipment may determine the third CORESET with the minimum index value in the latest time unit during which the PDCCH is to be detected, and determine the default beam corresponding to the first CORESET according to the fourth beam corresponding to the third CORESET.

In step 303, the default beam is determined according to the fourth beam.

In an embodiment of the present disclosure, when the default beam corresponding to the first CORESET is determined according to the fourth beam corresponding to the third CORESET, one or more of the fourth beams may be determined as the default beam corresponding to the first CORESET according to the number of the fourth beams and current service requirements.

In an implementation, the fourth beam may be determined as the default beam corresponding to the first CORESET.

Additionally, in response to determining that the network device and the user equipment do not pre-agree on a specified TRP, and the third CORESET may merely configure one beam at most, that is, the number of the fourth beams is one, the fourth beam may be determined as the default beam corresponding to the first CORESET.

Additionally, in response to determining that the network device and the user equipment do not pre-agree on a specified TRP, and the third CORESET may configure two beams at most, but merely one beam is configured currently, that is, the number of the fourth beams is one, the fourth beam may be determined as the default beam corresponding to the first CORESET.

Additionally, in response to determining that the network device and the user equipment do not pre-agree on a specified TRP, and the third CORESET may configure two beams at most, and two beams are configured currently, that is, the number of the fourth beams is two, the two fourth beams may be determined as the default beams corresponding to the first CORESET.

In another implementation, it may also be determined that the default beam corresponding to the first CORESET is one of the fourth beams corresponding to the specified TRP.

Additionally, in response to determining that the network device and the user equipment pre-agree on a specified TRP, and the third CORESET may configure two beams at most, and two beams are configured currently, that is, the number of the fourth beams is two, the fourth beam corresponding to the specified TRP may be determined as the default beam corresponding to the first CORESET.

For example, in case that one of the two fourth beams, such as TCI #0, corresponds to TRP #0 (or a TRP corresponding to CORESETPoolIndex #0) in two TRPs, and the other fourth beam, such as TCI #1, corresponds to TRP #1 (or a TRP corresponding to CORESETPoolIndex #1) in the two TRPs, the specified TRP may be the TRP #0 (or the TRP corresponding to CORESETPoolIndex #0), and the specified TRP may also be the TRP #1 (or the TRP corresponding to CORESETPoolIndex #1). In case that the specified TRP is the TRP #0 (or the TRP corresponding to CORESETPoolIndex #0), the TCI #0 is determined as the default beam corresponding to the first CORESET. In case that the specified TRP is the TRP #1 (or the TRP corresponding to CORESETPoolIndex #1), the TCI #1 is determined as the default beam corresponding to the first CORESET.

Further, since the first CORESETPoolIndex or TRP identifier corresponding to the first CORESET may be configured to identify the TRP corresponding to the first CORESET, a beam corresponding to the TRP corresponding to the first CORESET that is selected from the fourth beam according to a value of the first CORESETPoolIndex or TRP identifier may be determined as the default beam corresponding to the first CORESET. That is, in an implementation of the embodiment of the present disclosure, the above step 303 may include determining a fourth beam corresponding to a first specified value as the default beam, or determining a fourth beam corresponding to a second specified value as the default beam, or determining at least one fourth beam respectively corresponding to a first specified value and a second specified value as the default beam.

It is to be noted that the first specified value and the second specified value in an embodiment of the present disclosure may refer to values of the CORESETPoolIndex or the TRP identifier, which is not limited in the embodiment of the present disclosure. For ease of understanding, the first specified value and the second specified value are taken as an example of the values of the CORESETPoolIndex for specific description below.

Additionally, in response to the first CORESETPoolIndex being the first specified value, for example, the first specified value being 0 (or corresponding to TRP #0), the user equipment may determine a fourth beam corresponding to the first specified value in the fourth beams corresponding to the third CORESET as the default beam corresponding to the first CORESET.

Additionally, in response to the first CORESETPoolIndex being the second specified value, for example, the second specified value being 1 (or corresponding to TRP #1), the user equipment may determine a fourth beam corresponding to the second specified value in the fourth beams corresponding to the third CORESET as the default beam corresponding to the first CORESET.

Additionally, in response to the first CORESETPoolIndex being the first specified value and the second specified value, for example, the first specified value being 0 (or corresponding to TRP #0) and the second specified value being 1 (or corresponding to TRP #1), the user equipment may determine at least one fourth beam corresponding to the first specified value and the second specified value as the default beam corresponding to the first CORESET according to the number of pre-configured default beams and the number of fourth beams corresponding to each specified value.

As an example, the network device and the user equipment may pre-agree that the number of default beams corresponding to the first CORESET is one or two. In response to determining that merely the third CORESET with a CORESETPoolIndex being the first specified value exists in all CORESETs in the latest time unit during which the PDCCH is to be detected, the user equipment may determine a fourth beam corresponding to the first specified value as the default beam corresponding to the first CORESET. Alternatively, in response to determining that merely the third CORESET with a CORESETPoolIndex being the second specified value exists in all CORESETs in the latest time unit during which the PDCCH is to be detected, the user equipment may determine a fourth beam corresponding to the second specified value as the default beam corresponding to the first CORESET.

As an example, in response to determining that the third CORESET with a CORESETPoolIndex being the first specified value and the third CORESET with a CORESETPoolIndex being the second specified value exist in all CORESETs in the latest time unit during which the PDCCH is to be detected, the user equipment may determine that fourth beams corresponding to the first specified value and the second specified value are the default beams corresponding to the first CORESET in response to determining that the number of default beams is two. The user equipment may determine a fourth beam corresponding to a specified TRP as the default beam corresponding to the first CORESET, in response to determining that the number of default beams is one, and the network device and the user equipment pre-agree on the specified TRP. In this case, the CORESETPoolIndex corresponding to the first CORESET may be 0, 1, 0 and 1, or values other than 0 and 1, such as 2, 3 and 4.

In an embodiment of the present disclosure, steps 301 to 303 may be implemented in any one of the embodiments of the present disclosure, respectively, which are not limited in the embodiments of the present disclosure, and will not be elaborated herein.

In the method for determining the default beam provided in the embodiment of the present disclosure, the first CORESETPoolIndex corresponding to the first CORESET is determined, the fourth beam corresponding to the third CORESET with the minimum index value in the latest time unit during which the PDCCH is to be detected is determined according to the first CORESETPoolIndex, in which the CORESETPoolIndex corresponding to the third CORESET is the same as the CORESETPoolIndex corresponding to the first CORESET, and the default beam is determined according to the fourth beam. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

Another method for determining a default beam provided in an embodiment of the present disclosure is further described below with reference to FIG. 4.

Figure 4:
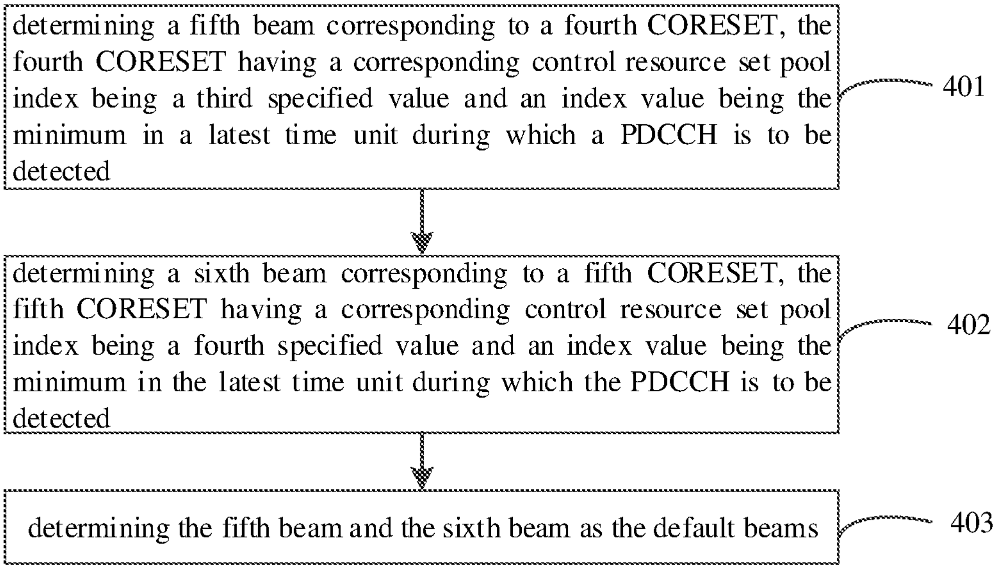
FIG. 4 is a flow chart showing another method for determining a default beam provided in an embodiment of the present disclosure.

FIG. 4 is a flow chart showing another method for determining a default beam provided in an embodiment of the present disclosure, which is performed by a user equipment.

As shown in FIG. 4, the method for determining the default beam includes steps as follows.

In step 401, a fifth beam corresponding to a fourth CORESET is determined, the fourth CORESET having a corresponding control resource set pool index (CORESETPoolIndex) being a third specified value and an index value being the minimum in a latest time unit during which a PDCCH is to be detected.

In an implementation, in response to determining that the network device and the user equipment pre-agree that the number of default beams corresponding to the first CORESET is two, the user equipment may further determine the two default beams corresponding to the first CORESET, respectively. Therefore, the user equipment may select the fourth CORESET having the CORESETPoolIndex being the third specified value and the index value being the minimum from all CORESETs in the latest time unit during which the PDCCH is to be detected according to the third specified value, and determine the fifth beam corresponding to the fourth CORESET. For example, the third specified value may be 0, which corresponds to the first TRP, namely, TRP #0.

In step 402, a sixth beam corresponding to a fifth CORESET is determined, the fifth CORESET having a corresponding control resource set pool index (CORESETPoolIndex) being a fourth specified value and an index value being the minimum in the latest time unit during which the PDCCH is to be detected.

In an embodiment of the present disclosure, after determining the fifth beam corresponding to the fourth CORESET, the user equipment may select the fifth CORESET having the CORESETPoolIndex being the fourth specified value and the index value being the minimum from all CORESETs in the latest time unit during which the PDCCH is to be detected according to the fourth specified value, and determine the sixth beam corresponding to the fifth CORESET. For example, the fourth specified value may be 1, which corresponds to the second TRP, namely, TRP #1.

It is to be noted that the time unit corresponding to the fourth CORESET and the time unit corresponding to the fifth CORESET may be different time units to ensure that the user equipment may determine two default beams.

In step 403, the fifth beam and the sixth beam are determined as the default beams.

In an embodiment of the present disclosure, after determining the fifth beam corresponding to the fourth CORESET and the sixth beam corresponding to the fifth CORESET, the fifth beam and the sixth beam may be determined as two default beams corresponding to the first CORESET. In this case, the CORESETPoolIndex corresponding to the first CORESET may be 0 and 1, or values other than 0 and 1, such as 2, 3 and 4. That is, it is indicated that the first CORESET corresponds to two TCI states, and each TCI state corresponds to one of the two TRPs.

In an embodiment of the present disclosure, steps 401 to 403 may be implemented in any one of the embodiments of the present disclosure, respectively, which are not limited in the embodiments of the present disclosure, and will not be elaborated herein.

In the method for determining the default beam provided in the embodiment of the present disclosure, the fifth beam corresponding to the fourth CORESET is determined, the fourth CORESET having the corresponding CORESETPoolIndex being the third specified value and the index value being the minimum in the latest time unit during which the PDCCH is to be detected, the sixth beam corresponding to the fifth CORESET is determined, the fifth CORESET having the corresponding CORESETPoolIndex being the fourth specified value and the index value being the minimum in the latest time unit during which the PDCCH is to be detected, and the fifth beam and the sixth beam are determined as the default beams. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

Another method for determining a default beam provided in an embodiment of the present disclosure is further described below with reference to FIG. 5.

Figure 5:
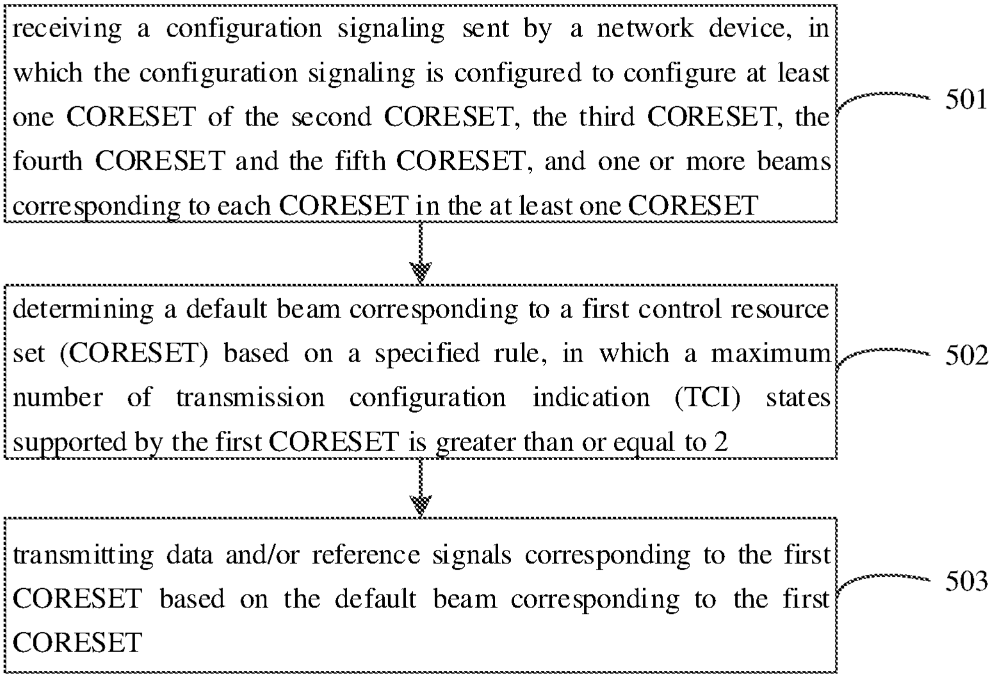
FIG. 5 is a flow chart showing another method for determining a default beam provided in an embodiment of the present disclosure.

FIG. 5 is a flow chart showing another method for determining a default beam provided in an embodiment of the present disclosure, which is performed by a user equipment.

As shown in FIG. 5, the method for determining the default beam includes steps as follows.

In step 501, a configuration signaling sent by a network device is received, in which the configuration signaling is configured to configure at least one CORESET of the second CORESET, the third CORESET, the fourth CORESET and the fifth CORESET, and one or more beams corresponding to each CORESET in the at least one CORESET.

The configuration signaling includes a MAC CE and/or a DCI.

In an embodiment of the present disclosure, the network device may configure each CORESET and one or more beams corresponding to each CORESET through at least one of the MAC CE and the DCI.

In an implementation, when the network device configures at least one CORESET and a beam corresponding thereto through the MAC CE, the network device may determine the number of beams that may be activated for the at least one CORESET according to the number of self-contained TRPs and current service requirements, and activate a corresponding number of beams through the MAC CE, so that the user equipment may determine one or more beams corresponding to the at least one CORESET according to a received MAC CE.

In an implementation, when the network device configures at least one CORESET and a beam corresponding thereto through the DCI, the network device may also determine the number of beams that may be activated for the at least one CORESET according to the number of self-contained TRPs and current service requirements, and configure a corresponding number of beams for the at least one CORESET by sending the DCI to the user equipment, so that the user equipment may determine one or more beams corresponding to the at least one CORESET according to a received DCI.

It is to be noted that a TCI status field configured to indicate a beam in the DCI may be displayed as a plurality of different code points at different moments, and each code point may correspond to a group of beams, in which each group of beams may include one or two beams. Moreover, a correspondence between the code point and each group of beams may be indicated by the MAC CE, so that when the network device configures at least one CORESET and one or more beams corresponding thereto through the DCI, the configuration signaling may include both the MAC CE and the DCI.

In step 502, a default beam corresponding to a first control resource set (CORESET) is determined based on a specified rule, in which a maximum number of transmission configuration indication (TCI) states supported by the first CORESET is greater than or equal to 2.

In an embodiment of the present disclosure, step 502 may be implemented in any one of the embodiments of the present disclosure, respectively, which is not limited in the embodiments of the present disclosure, and will not be elaborated herein.

In step 503, data and/or reference signals corresponding to the first CORESET is transmitted based on the default beam corresponding to the first CORESET.

The data corresponding to the first CORESET may include downlink data and uplink data corresponding to or scheduled by the first CORESET. The reference signals corresponding to the first CORESET may include downlink reference signals and uplink reference signals corresponding to or scheduled by the first CORESET.

In an embodiment of the present disclosure, the default beam corresponding to the first CORESET may be configured to receive or send the downlink data, the downlink reference signals, the uplink data, the uplink reference signals, and the like corresponding to or scheduled by the first CORESET. Therefore, after determining the default beam corresponding to the first CORESET, the user equipment may transmit the downlink data, the downlink reference signals, the uplink data, the uplink reference signals, and the like corresponding to or scheduled by the first CORESET based on the default beam corresponding to the first CORESET. The default beam corresponding to the first CORESET may also be configured for sending UL configured grant free uplink data.

As an example, the default beam corresponding to the first CORESET may be configured for receiving a physical downlink shared channel (PDSCH). That is, in an implementation of the embodiment of the present disclosure, the data corresponding to the first CORESET may include data carried on a physical downlink shared channel (PDSCH) scheduled by a second DCI sent on a PDCCH in the first CORESET.

As an example, the default beam corresponding to the first CORESET may also be configured for sending a physical uplink shared channel (PUSCH). That is, in an implementation of the embodiment of the present disclosure, the data corresponding to the first CORESET may include data carried on a physical uplink shared channel (PUSCH) scheduled by a third DCI sent on a PDCCH in the first CORESET.

As an example, the default beam corresponding to the first CORESET may also be configured for sending or receiving a physical random access channel (PRACH), a PUCCH, a CSI-RS, or a SRS. That is, in an implementation of the embodiment of the present disclosure, the data corresponding to the first CORESET may include the PRACH, the PUCCH, the CSI-RS, or the SRS.

In the method for determining the default beam provided in the embodiment of the present disclosure, the configuration signaling sent by the network device is received, in which the configuration signaling is configured to configure at least one CORESET of the second CORESET, the third CORESET, the fourth CORESET and the fifth CORESET, and one or more beams corresponding to each CORESET in the at least one CORESET, the default beam corresponding to the first control resource set (CORESET) is determined based on the specified rule, in which the maximum number of transmission configuration indication (TCI) states supported by the first CORESET is greater than or equal to 2, and the data and/or reference signals corresponding to the first CORESET is transmitted based on the default beam corresponding to the first CORESET. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

Figure 6:
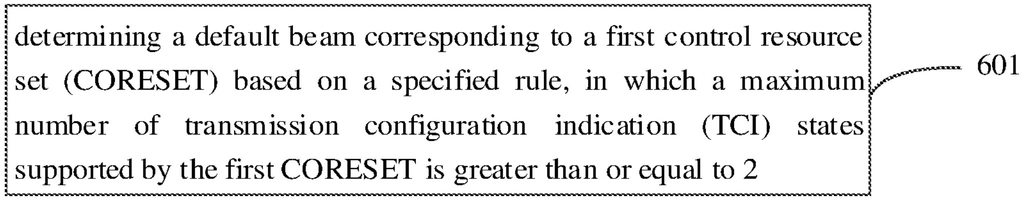
FIG. 6 is a flow chart showing another method for determining a default beam provided in an embodiment of the present disclosure.

FIG. 6 is a flow chart showing another method for determining a default beam provided in an embodiment of the present disclosure, which is performed by a network device.

As shown in FIG. 6, the method for determining the default beam includes a step as follows.

In step 601, a default beam corresponding to a first control resource set (CORESET) is determined based on a specified rule, in which a maximum number of transmission configuration indication (TCI) states supported by the first CORESET is greater than or equal to 2.

It is to be noted that application scenarios of the method for determining the default beam in an embodiment of the present disclosure may include a scenario where the default beam is determined for a CORESET that may configure a plurality of TCI states. The TCI state is a beam, and one TCI state may correspond to one beam.

The first CORESET may refer to a CORESET that may support the plurality of TCI states. It is to be noted that although the first CORESET may support the plurality of TCI states, one TCI state may also be configured for the first CORESET at certain moments according to actual service requirements, which is not limited in the embodiment of the present disclosure.

As an example, the first CORESET may be a CORESET that may support two TCI states. It is to be noted that the following contents of the present disclosure are specifically described by taking the first CORESET as the CORESET that may support the two TCI states.

In an implementation, a medium access control control element (MAC CE) signaling may be used as a beam indication signaling of the CORESET, so that the default beam corresponding to the first CORESET may be determined through the MAC CE signaling. That is, in an implementation of the embodiment of the present disclosure, the above step 601 may include sending a medium access control control element (MAC CE), in which the MAC CE is configured to activate a first beam corresponding to the first CORESET, and determining the first beam as the default beam corresponding to the first CORESET.

In an embodiment of the present disclosure, the network device may determine the number of beams that may be activated for the first CORESET according to the number of self-contained TRPs and current service requirements, and activate a corresponding number of first beams through the MAC CE, and the first beam is determined as the default beam corresponding to the first CORESET.

For example, it is determined that the network device includes 2 TRPs, and the network device may determine that the number of the first beams may be 1 or 2, so that the network device may activate one first beam for the first CORESET, or two first beams for the first CORESET by sending the MAC CE to the user device. It is to be noted that when the two first beams are activated for the first CORESET, each first beam corresponds to a different TRP. The TRPs may be distinguished by at least one of TRP identifiers, control resource set pool indexes (CORESETPoolIndexes), reference signal resource identifiers, reference signal resource set identifiers, panel IDs, and the like.

It is to be noted that when determining the default beam corresponding to the first CORESET according to the first beam, the network device may determine a corresponding first beam as the default beam corresponding to the first CORESET according to the number of the first beams and the number of preset default beams. Additionally, it may be divided into the following three cases.

Case 1

The number of the first beams is one, and the one first beam is determined as the default beam corresponding to the first CORESET.

In an implementation, in response to determining that the number of the first beams is one, the network device may directly determine the first beam activated by the MAC CE for the first CORESET as the default beam corresponding to the first CORESET.

Case 2

The number of the first beams is two, and the two first beams are determined as the default beams corresponding to the first CORESET.

In an implementation, in response to determining that the number of the first beams is two, and the number of default beams pre-agreed between the network device and the user equipment is two, or the number of default beams is not pre-agreed, the network device may directly determine the two first beams activated by the MAC CE for the first CORESET as the default beams corresponding to the first CORESET.

Case 3

The number of the first beams is two, and one of the two first beams corresponding to a specified transmission and reception point (TRP) is determined as the default beam corresponding to the first CORESET.

In an implementation, the MAC CE may contain a plurality of bits configured to activate TCI states of different TRPs, respectively. The network device may know which TRP's TCI state each bit in the MAC CE is used to activate. Therefore, in response to determining that the number of the first beams is two, and the network device and the user equipment pre-agree on a specified TRP, the network device may determine a first beam corresponding to the specified TRP in the two first beams according to a correspondence between the bit in the MAC CE and the TRP, and the first beam corresponding to the specified TRP is determined as the default beam corresponding to the first CORESET.

For example, in case that one of the two first beams corresponds to TRP #0 (or a TRP corresponding to CORESETPoolIndex #0) in two TRPs, and the other first beam corresponds to TRP #1 (or a TRP corresponding to CORESETPoolIndex #1) in the two TRPs, the specified TRP may be the TRP #0 (or the TRP corresponding to CORESETPoolIndex #0), and the specified TRP may also be the TRP #1 (or the TRP corresponding to CORESETPoolIndex #1).

In another implementation, the DCI may also be used as a beam indication signaling of the CORESET, so that the network device may determine the default beam corresponding to the first CORESET through the DCI. That is, in an implementation of the embodiment of the present disclosure, the above step 601 may include sending first downlink control information (DCI), in which the first DCI is configured to indicate a second beam corresponding to the first CORESET, and determining the second beam as the default beam corresponding to the first CORESET.

In an embodiment of the present disclosure, the network device may also determine the number of beams that may be activated for the first CORESET according to the number of self-contained TRPs and current service requirements, and configure a corresponding number of second beams for the first CORESET by sending the DCI to the user equipment, and the second beam is determined as the default beam corresponding to the CORESET.

It is to be noted that a TCI status field configured to indicate a beam in the DCI is a plurality of bits (for example, 3 bits). The plurality of bits may be displayed as a plurality of different code points at different moments, such as '000', '001', '010', '011', '100', '101', '110', and '111'. Each code point may correspond to a group of second beams, in which each group of second beams may include one second beam or two second beams.

As an example, a correspondence between the code point and each group of second beams may be indicated by the MAC CE. That is, a plurality of second beams may be activated by the MAC CE, and each bit in the MAC CE is in one-to-one correspondence to the two second beams corresponding to each code point, respectively. However, merely one second beam of the two second beams corresponding to each code point may exist and is indicated by bit information in the MAC CE. When both the two second beams corresponding to each code point exist, the two second beams correspond to different TRPs, respectively.

It is to be noted that when determining the default beam corresponding to the first CORESET according to the second beam, the network device may determine the corresponding second beam as the default beam corresponding to the first CORESET according to the number of the second beams corresponding to each code point in the DCI and the number of preset default beams. Additionally, it may be divided into the following four cases.

Case 1

At least one of the second beams is determined as the default beam corresponding to the first CORESET.

In an implementation, in response to determining that the number of second beams is one, that is, the DCI indicates that a beam corresponding to the first CORESET is one beam, the network device may directly determine one second beam indicated by the DCI as the default beam corresponding to the first CORESET.

In another implementation, in response to determining that the number of second beams is two, that is, the DCI indicates that beams corresponding to the first CORESET are two beams, and indicates that the default beam corresponding to the first CORESET is one beam, the network device may determine any one of the two second beams as the default beam corresponding to the first CORESET.

In yet another implementation, in response to determining that the number of second beams is two, that is, the DCI indicates that beams corresponding to the first CORESET are two beams, and indicates that the default beams corresponding to the first CORESET are two beams, the network device may determine the two second beams indicated by the DCI as the default beams corresponding to the first CORESET.

Case 2

A second beam corresponding to a code point with a minimum value configured to indicate one second beam in the first DCI is determined as the default beam corresponding to the first CORESET.

In an implementation, since each code point in the DCI may correspond to a group of second beams, the network device may determine a second beam corresponding to one of the code points as the default beam corresponding to the first CORESET. Therefore, in response to determining that the DCI indicates that the default beam corresponding to the first CORESET is one beam, the network device may first select code points corresponding to one second beam in the DCI, and one second beam corresponding to a selected code point with a minimum value is determined as the default beam corresponding to the first CORESET.

For example, each code point in the DCI may be represented by 3 bits. For example, values of the code point may include 000, 001, 010, 011, 100, 101, 110, 111, and so on, and the above values are arranged in an ascending order. For example, it is determined that a code point “011” in the DCI corresponds to one second beam, and a code point “000” also indicates one second beam, one second beam indicated by the code point “000” may be determined as the default beam corresponding to the first CORESET.

Case 3

Two second beams corresponding to a code point with a minimum value configured to indicate the two second beams in the first DCI are determined as the default beams corresponding to the first CORESET.

In an implementation, since each code point in the DCI may correspond to a group of second beams, the network device may determine a second beam corresponding to one of the code points as the default beam corresponding to the first CORESET. Therefore, in response to determining that the DCI indicates that default beams corresponding to the first CORESET are two beams, the network device may first select code points corresponding to two second beams in the DCI, and two second beams corresponding to a selected code point with a minimum value are determined as the default beams corresponding to the first CORESET.

For example, it is determined that a code point “011” in the DCI corresponds to two second beams, and a code point “000” also indicates two second beams, the two second beams indicated by the code point “000” may be determined as the default beams corresponding to the first CORESET.

Case 4

One second beam corresponding to a specified TRP in two second beams is determined as the default beam corresponding to the first CORESET, the two second beams corresponding to a code point with a minimum value configured to indicate the two second beams in the first DCI.

In an implementation, since each code point in the DCI may correspond to a group of second beams, the network device may determine a second beam corresponding to one of the code points as the default beam corresponding to the first CORESET. Therefore, in response to determining that the DCI indicates that beams corresponding to the first CORESET are two beams, and indicates that the default beam corresponding to the first CORESET is one beam, and the network device and the user equipment pre-agree on a specified TRP, the network device may first select code points corresponding to the two second beams in the DCI, and determine a second beam corresponding to the specified TRP in the two second beams corresponding to the selected code point with the minimum value according to a correspondence between each bit in the MAC CE and the TRP, and the second beam corresponding to the specified TRP is determined as the default beam corresponding to the first CORESET.

For example, a code point “011” in the DCI corresponds to two second beams, and a code point “000” also indicates two second beams, and the two second beams indicated by “000” are TCI #0 and TCI #1, respectively. The TCI #0 corresponds to TRP #0 (or a TRP corresponding to CORESETPoolIndex #0). The TCI #1 corresponds to TRP #1 (or a TRP corresponding to CORESETPoolIndex #1). In case that the specified TRP is the TRP #0 (or the TRP corresponding to CORESETPoolIndex #0), the TCI #0 is determined as the default beam corresponding to the first CORESET. In case that the specified TRP is the TRP #1 (or the TRP corresponding to CORESETPoolIndex #1), the TCI #1 is determined as the default beam corresponding to the first CORESET.

In an embodiment of the present disclosure, the MAC CE may be a MAC CE indicating a dedicated beam of the first CORESET, or the MAC CE may also be a MAC CE indicating a common beam of a group including the first CORESET.

In addition to the first CORESET, the group may also include at least one of other CORESETs, a PDSCH, a physical uplink shared channel (PUSCH), a physical uplink control channel (PUCCH), a channel state information reference signal (CSI-RS), a sounding reference signal (SRS), a positioning reference signal (PRS), a demodulation reference signal (DMRS), and the like.

It is to be noted that the dedicated beam may refer to a beam that is merely configured for the first CORESET. The common beam may refer to a beam that may be configured for at least one group of channels and/or at least one reference signal. That is, in addition to the first CORESET, the common beam may be configured for other CORESETs, PDSCHs, PUSCHs, reference signals, and the like belonging to the same group as the first CORESET.

Further, in an implementation of the embodiment of the present disclosure, the network device may also determine the default beam corresponding to the first CORESET in the following ways.

Way 1

A third beam corresponding to a second CORESET with a minimum index value in a latest time unit during which a physical downlink control channel (PDCCH) is to be detected is determined. The default beam is determined according to the third beam.

Further, in an implementation of the embodiment of the present disclosure, determining the default beam according to the third beam includes determining the third beam as the default beam, or determining the default beam as one of the third beams corresponding to a specified TRP.

Way 2

A first CORESETPoolIndex corresponding to the first CORESET is determined. A fourth beam corresponding to a third CORESET with a minimum index value in a latest time unit during which a PDCCH is to be detected is determined according to the first CORESETPoolIndex, in which a CORESETPoolIndex corresponding to the third CORESET is the same as a CORESETPoolIndex corresponding to the first CORESET. The default beam is determined according to the fourth beam.

Further, in an implementation of the embodiment of the present disclosure, determining the default beam according to the fourth beam includes determining the fourth beam as the default beam, or determining the default beam as one of the fourth beams corresponding to a specified TRP.

Further, in an implementation of the embodiment of the present disclosure, determining the default beam according to the fourth beam includes determining a fourth beam corresponding to a first specified value as the default beam, or determining a fourth beam corresponding to a second specified value as the default beam, or determining at least one fourth beam respectively corresponding to a first specified value and a second specified value as the default beam.

Way 3

A fifth beam corresponding to a fourth CORESET is determined, the fourth CORESET having a corresponding control resource set pool index (CORESETPoolIndex) being a third specified value and an index value being the minimum in a latest time unit during which a PDCCH is to be detected. A sixth beam corresponding to a fifth CORESET is determined, the fifth CORESET having a corresponding control resource set pool index being a fourth specified value and an index value being the minimum in the latest time unit during which the PDCCH is to be detected. The fifth beam and the sixth beam are determined as the default beams.

In an embodiment of the present disclosure, the specific way for the network device to determine the default beam corresponding to the first CORESET may be the same as the specific way for the user device to determine the default beam corresponding to the first CORESET in the above-mentioned embodiments. That is, step 601 may be implemented in any one of the embodiments of the present disclosure, respectively, which is not limited in the embodiments of the present disclosure, and will not be elaborated herein.

It is to be noted that, for the specific implementation process of determining the default beam corresponding to the first CORESET in ways 1 to 3 by the network device, reference may be made to the detailed description of the above-mentioned embodiments, which will not be elaborated herein.

Further, the network device may also configure at least one CORESET and one or more beams corresponding thereto. That is, in an implementation of the embodiment of the present disclosure, the method for determining the default beam may further include sending a configuration signaling, in which the configuration signaling is configured to configure at least one CORESET and one or more beams corresponding to each CORESET in the at least one CORESET.

The configuration signaling includes a MAC CE and/or a DCI.

In an embodiment of the present disclosure, the network device may configure each CORESET and one or more beams corresponding to each CORESET through at least one of the MAC CE and the DCI.

In an implementation, when the network device configures at least one CORESET and a beam corresponding thereto through the MAC CE, the network device may determine the number of beams that may be activated for the at least one CORESET according to the number of self-contained TRPs and current service requirements, and activate a corresponding number of beams through the MAC CE.

In an implementation, when the network device configures at least one CORESET and a beam corresponding thereto through the DCI, the network device may also determine the number of beams that may be activated for the at least one CORESET according to the number of self-contained TRPs and current service requirements, and configure a corresponding number of beams for the at least one CORESET by sending the DCI to the user equipment.

It is to be noted that a TCI status field configured to indicate a beam in the DCI may be displayed as a plurality of different code points at different moments, and each code point may correspond to a group of beams, in which each group of beams may include one or two beams. Moreover, a correspondence between the code point and each group of beams may be indicated by the MAC CE, so that when the network device configures at least one CORESET and one or more beams corresponding thereto through the DCI, the configuration signaling may include both the MAC CE and the DCI.

In the method for determining the default beam provided in the embodiment of the present disclosure, the default beam corresponding to the first CORESET is determined based on the specified rule, in which the maximum number of TCI states supported by the first CORESET is greater than or equal to 2. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

In order to implement the above-mentioned embodiment, the present disclosure also provides an apparatus for determining the default beam.

Figure 7:
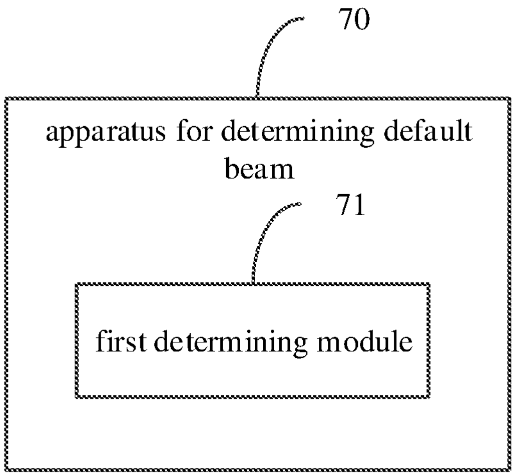
FIG. 7 is a schematic diagram illustrating an apparatus for determining a default beam provided in an embodiment of the present disclosure.

FIG. 7 is a schematic diagram illustrating an apparatus for determining a default beam provided in an embodiment of the present disclosure, which is performed by a user equipment.

As shown in FIG. 7, an apparatus for determining a default beam 70 includes a first determining module 71 configured to determine a default beam corresponding to a first control resource set (CORESET) based on a specified rule, in which a maximum number of transmission configuration indication (TCI) states supported by the first CORESET is greater than or equal to 2.

In actual use, the apparatus for determining the default beam provided in an embodiment of the present disclosure may be configured in any user equipment to execute the above-mentioned method for determining the default beam.

In the apparatus for determining the default beam provided in the embodiment of the present disclosure, the default beam corresponding to the first CORESET is determined based on the specified rule, in which the maximum number of TCI states supported by the first CORESET is greater than or equal to 2. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

In an implementation of the present disclosure, the first determining module 71 includes a first receiving unit configured to receive a medium access control control element (MAC CE), in which the MAC CE is configured to activate a first beam corresponding to the first CORESET, a first determining unit configured to determine the first beam as the default beam corresponding to the first CORESET.

Further, in another implementation of the present disclosure, the first determining unit is specifically configured to the number of the first beams being one, and the one first beam being determined as the default beam corresponding to the first CORESET, or the number of the first beams being two, and the two first beams being determined as the default beams corresponding to the first CORESET, or the number of the first beams being two, and one of the two first beams corresponding to a specified transmission and reception point (TRP) being determined as the default beam corresponding to the first CORESET.

Further, in another implementation of the present disclosure, the first determining module 71 includes a second receiving unit configured to receive first downlink control information (DCI), in which the first DCI is configured to indicate a second beam corresponding to the first CORESET, and a second determining unit configured to determine the second beam as the default beam corresponding to the first CORESET.

Further, in another implementation of the present disclosure, the second determining unit is specifically configured to determine at least one of the second beams as the default beam corresponding to the first CORESET, or determine a second beam corresponding to a code point with a minimum value configured to indicate one second beam in the first DCI as the default beam corresponding to the first CORESET, or determine two second beams corresponding to a code point with a minimum value configured to indicate the two second beams in the first DCI as the default beams corresponding to the first CORESET, or determine one second beam corresponding to a specified TRP in two second beams as the default beam corresponding to the first CORESET, the two second beams corresponding to a code point with a minimum value configured to indicate the two second beams in the first DCI.

Further, in another implementation of the present disclosure, the MAC CE is a MAC CE indicating a dedicated beam of the first CORESET, or the MAC CE is a MAC CE indicating a common beam of a group including the first CORESET.

Further, in another implementation of the present disclosure, the first determining module 71 includes a third determining unit configured to determine a third beam corresponding to a second CORESET with a minimum index value in a latest time unit during which a physical downlink control channel (PDCCH) is to be detected, and a fourth determining unit configured to determine the default beam according to the third beam.

Further, in another implementation of the present disclosure, the fourth determining unit is specifically configured to determine the third beam as the default beam, or determine the default beam as one of the third beams corresponding to a specified TRP.

Further, in another implementation of the present disclosure, the first determining module 71 includes a fifth determining unit configured to determine a first control resource set pool index corresponding to the first CORESET, a sixth determining unit configured to determine a fourth beam corresponding to a third CORESET with a minimum index value in a latest time unit during which a PDCCH is to be detected according to the first control resource set pool index, in which a control resource set pool index corresponding to the third CORESET is the same as a control resource set pool index corresponding to the first CORESET, a seventh determining unit configured to determine the default beam according to the fourth beam.

Further, in another implementation of the present disclosure, the seventh determining unit is specifically configured to determine the fourth beam as the default beam, or determine the default beam as one of the fourth beams corresponding to a specified TRP.

Further, in another implementation of the present disclosure, the seventh determining unit is specifically configured to determine a fourth beam corresponding to a first specified value as the default beam, or determine a fourth beam corresponding to a second specified value as the default beam, or determine at least one fourth beam respectively corresponding to a first specified value and a second specified value as the default beam.

Further, in another implementation of the present disclosure, the first determining module 71 includes an eighth determining unit is configured to determine a fifth beam corresponding to a fourth CORESET, the fourth CORESET having a corresponding control resource set pool index being a third specified value and an index value being the minimum in a latest time unit during which a PDCCH is to be detected, a ninth determining unit configured to determine a sixth beam corresponding to a fifth CORESET, the fifth CORESET having a corresponding control resource set pool index being a fourth specified value and an index value being the minimum in the latest time unit during which the PDCCH is to be detected, and a tenth determining unit configured to determine the fifth beam and the sixth beam as the default beams.

Further, in another implementation of the present disclosure, the apparatus for determining the default beam 70 further includes a receiving module configured to receive a configuration signaling sent by a network device, in which the configuration signaling is configured to configure at least one CORESET of the second CORESET, the third CORE- SET, the fourth CORESET and the fifth CORESET, and one or more beams corresponding to each CORESET in the at least one CORESET.

Further, in another implementation of the present disclosure, the configuration signaling includes a MAC CE and/or a DCI.

Further, in another implementation of the present disclosure, the apparatus for determining the default beam 70 further includes a transmitting module configured to transmit data and/or reference signals corresponding to the first CORESET based on the default beam corresponding to the first CORESET.

Further, in another implementation of the present disclosure, the data corresponding to the first CORESET includes at least one of data carried on a physical downlink shared channel (PDSCH) scheduled by a second DCI sent on a PDCCH in the first CORESET, and data carried on a physical uplink shared channel (PUSCH) scheduled by a third DCI sent on a PDCCH in the first CORESET.

It is to be noted that the above-mentioned explanations on the embodiments of the method for determining the default beam shown in FIG. 1 to FIG. 5 are also applicable to the apparatus for determining the default beam 70 in the embodiment, which will not be elaborated herein.

In the apparatus for determining the default beam provided in the embodiment of the present disclosure, the third beam corresponding to the second CORESET with the minimum index value in the latest time unit during which the PDCCH is to be detected is determined, and the default beam is determined according to the third beam. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

In order to implement the above-mentioned embodiment, the present disclosure also provides an apparatus for determining a default beam.

Figure 8:
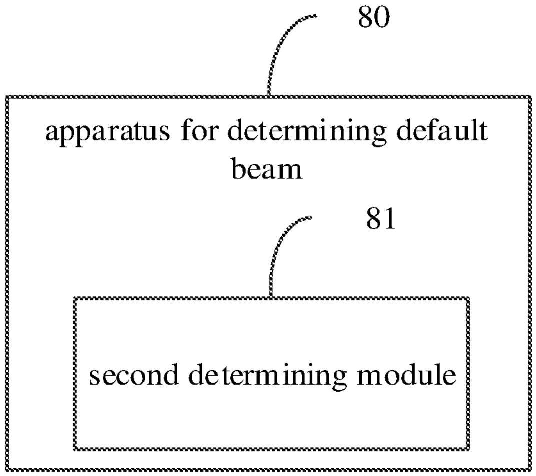
FIG. 8 is a schematic diagram illustrating another apparatus for determining a default beam provided in an embodiment of the present disclosure.

FIG. 8 is a schematic diagram illustrating another apparatus for determining a default beam provided in an embodiment of the present disclosure, which is performed by a network device.

As shown in FIG. 8, an apparatus for determining the default beam 80 includes a second determining module 81 configured to determine a default beam corresponding to a first control resource set (CORESET) based on a specified rule, in which a maximum number of transmission configuration indication (TCI) states supported by the first CORESET is greater than or equal to 2.

In actual use, the apparatus for determining the default beam provided in an embodiment of the present disclosure may be configured in any user equipment to execute the above-mentioned method for determining the default beam.

In an implementation of the present disclosure, the second determining module 81 includes a first sending unit configured to send a medium access control control element (MAC CE), in which the MAC CE is configured to activate a first beam corresponding to the first CORESET, and an eleventh determining unit configured to determine the first beam as the default beam corresponding to the first CORESET.

Further, in another implementation of the present disclosure, the second determining module 81 includes a second sending unit configured to send first downlink control information (DCI), in which the first DCI is configured to indicate a second beam corresponding to the first CORESET, and a twelfth determining unit configured to determine the second beam as the default beam corresponding to the first CORESET.

Further, in another implementation of the present disclosure, the apparatus for determining the default beam 80 further includes a sending module configured to send a configuration signaling, in which the configuration signaling is configured to configure at least one CORESET and one or more beams corresponding to each CORESET in the at least one CORESET.

It is to be noted that the above-mentioned explanations on the embodiments of the method for determining the default beam shown in FIG. 6 are also applicable to the apparatus for determining the default beam 80 in the embodiment, which will not be elaborated herein.

In the apparatus for determining the default beam provided in the embodiment of the present disclosure, the default beam corresponding to the first CORESET is determined based on the specified rule, in which the maximum number of TCI states supported by the first CORESET is greater than or equal to 2. Therefore, the default beam corresponding to the CORESET supporting the plurality of TCI states is determined by means of the predefined specified rule, thus improving the accuracy of determining the default beam for the CORESET corresponding to the plurality of TCI states, and increasing the reliability of multi-TRP data transmission.

In order to implement the above-mentioned embodiment, the present disclosure also provides a user equipment.

The user equipment provided in an embodiment of the present disclosure includes a processor, a transceiver, a memory and an executable program stored in the memory and capable of being run by the processor, in which the processor may perform following operations when running the executable program. A default beam corresponding to a first control resource set (CORESET) is determined based on a specified rule, in which a maximum number of transmission configuration indication (TCI) states supported by the first CORESET is greater than or equal to 2.

The processor may include various types of storage medium, which are non-transitory computer storage medium that may continue to memorize information stored thereon after the user equipment is powered down.

The processor may be connected to the memory through a bus or the like, for reading the executable program stored on the memory, for example, as shown in at least one of FIGS. 1 to 5.

In an implementation of the present disclosure, determining the default beam corresponding to the first CORESET based on the specified rule includes receiving a medium access control control element (MAC CE), in which the MAC CE is configured to activate a first beam corresponding to the first CORESET, and determining the first beam as the default beam corresponding to the first CORESET.

Further, in another implementation of the present disclosure, determining the first beam as the default beam corresponding to the first CORESET includes the number of the first beams being one, and the one first beam being determined as the default beam corresponding to the first CORESET, or the number of the first beams being two, and the two first beams being determined as the default beams corresponding to the first CORESET, or the number of the first beams being two, and one of the two first beams corresponding to a specified transmission and reception point (TRP) being determined as the default beam corresponding to the first CORESET.

Further, in another implementation of the present disclosure, determining the default beam corresponding to the first CORESET based on the specified rule includes receiving first downlink control information (DCI), in which the first DCI is configured to indicate a second beam corresponding to the first CORESET, and determining the second beam as the default beam corresponding to the first CORESET.

Further, in another implementation of the present disclosure, determining the second beam as the default beam corresponding to the first CORESET includes determining at least one of the second beams as the default beam corresponding to the first CORESET, or determining a second beam corresponding to a code point with a minimum value configured to indicate one second beam in the first DCI as the default beam corresponding to the first CORESET, or determining two second beams corresponding to a code point with a minimum value configured to indicate the two second beams in the first DCI as the default beams corresponding to the first CORESET, or determining one second beam corresponding to a specified TRP in two second beams as the default beam corresponding to the first CORESET, the two second beams corresponding to a code point with a minimum value configured to indicate the two second beams in the first DCI.

Further, in another implementation of the present disclosure, the MAC CE is a MAC CE indicating a dedicated beam of the first CORESET, or the MAC CE is a MAC CE indicating a common beam of a group including the first CORESET.

Further, in another implementation of the present disclosure, determining the default beam corresponding to the first CORESET based on the specified rule includes determining a third beam corresponding to a second CORESET with a minimum index value in a latest time unit during which a physical downlink control channel (PDCCH) is to be detected, and determining the default beam according to the third beam.

Further, in another implementation of the present disclosure, determining the default beam according to the third beam includes determining the third beam as the default beam, or determining the default beam as one of the third beams corresponding to a specified TRP.

Further, in another implementation of the present disclosure, determining the default beam corresponding to the first CORESET based on the specified rule includes determining a first control resource set pool index corresponding to the first CORESET, determining a fourth beam corresponding to a third CORESET with a minimum index value in a latest time unit during which a PDCCH is to be detected according to the first control resource set pool index, in which a control resource set pool index corresponding to the third CORESET is the same as a control resource set pool index corresponding to the first CORESET, and determining the default beam according to the fourth beam.

Further, in another implementation of the present disclosure, determining the default beam according to the fourth beam includes determining the fourth beam as the default beam, or determining the default beam as one of the fourth beams corresponding to a specified TRP.

Further, in another implementation of the present disclosure, determining the default beam according to the fourth beam includes determining a fourth beam corresponding to a first specified value as the default beam, or determining a fourth beam corresponding to a second specified value as the default beam, or determining at least one fourth beam respectively corresponding to a first specified value and a second specified value as the default beams.

Further, in another implementation of the present disclosure, determining the default beam corresponding to the first CORESET based on the specified rule includes determining a fifth beam corresponding to a fourth CORESET, the fourth CORESET having a corresponding control resource set pool index being a third specified value and an index value being the minimum in a latest time unit during which a PDCCH is to be detected, determining a sixth beam corresponding to a fifth CORESET, the fifth CORESET having a corresponding control resource set pool index being a fourth specified value and an index value being the minimum in the latest time unit during which the PDCCH is to be detected, and determining the fifth beam and the sixth beam as the default beams.

Further, in another implementation of the present disclosure, the processor is further configured to perform following operations receiving a configuration signaling sent by a network device, in which the configuration signaling is configured to configure at least one CORESET of the second CORESET, the third CORESET, the fourth CORESET and the fifth CORESET, and one or more beams corresponding to each CORESET in the at least one CORESET.

Further, in another implementation of the present disclosure, the configuration signaling includes a MAC CE and/or a DCI.

Further, in another implementation of the present disclosure, the processor is further configured to perform following operations transmitting data and/or reference signals corresponding to the first CORESET based on the default beam corresponding to the first CORESET.

Further, in another implementation of the present disclosure, the data corresponding to the first CORESET includes at least one of data carried on a physical downlink shared channel (PDSCH) scheduled by a second DCI sent on a PDCCH in the first CORESET, and data carried on a physical uplink shared channel (PUSCH) scheduled by a third DCI sent on a PDCCH in the first CORESET.

In order to implement the above-mentioned embodiment, the present disclosure also provides a network device.

The network device provided in an embodiment of the present disclosure includes a processor, a transceiver, a memory and an executable program stored in the memory and capable of being run by the processor, in which the processor may perform following operations when running the executable program. A default beam corresponding to a first control resource set (CORESET) is determined based on a specified rule, in which a maximum number of transmission configuration indication (TCI) states supported by the first CORESET is greater than or equal to 2.

The processor may include various types of storage medium, which are non-transitory computer storage medium that may continue to memorize information stored thereon after the user equipment is powered down.

The processor may be connected to the memory through a bus or the like, for reading the executable program stored on the memory, for example, as shown in at least one of FIG. 6.

In an implementation of the present disclosure, determining the default beam corresponding to the first CORESET based on the specified rule includes sending a medium access control control element (MAC CE), in which the MAC CE is configured to activate a first beam corresponding to the first CORESET, and determining the first beam as the default beam corresponding to the first CORESET.

Further, in another implementation of the present disclosure, determining the default beam corresponding to the first CORESET based on the specified rule includes sending first downlink control information (DCI), in which the first DCI is configured to indicate a second beam corresponding to the first CORESET, and determining the second beam as the default beam corresponding to the first CORESET.

Further, in another implementation of the present disclosure, the processor is further configured to perform following operations sending a configuration signaling, in which the configuration signaling is configured to configure at least one CORESET and one or more beams corresponding to each CORESET in the at least one CORESET.

In order to implement the above-mentioned embodiment, the present disclosure also provides a system for determining a default beam. The system for determining the default beam includes a user equipment and a network device.

The user equipment includes a transceiver, a memory, and a processor connected to the transceiver and the memory, respectively, and configured to control wireless signal transmission and reception of the transceiver and perform following operations by executing computer-executable instructions on the memory: determining a default beam corresponding to a first control resource set (CORESET) based on a specified rule, in which a maximum number of transmission configuration indication (TCI) states supported by the first CORESET is greater than or equal to 2.

The network device includes a transceiver, a memory, and a processor connected to the transceiver and the memory, respectively, and configured to control wireless signal transmission and reception of the transceiver and perform following operations by executing computer-executable instructions on the memory: determining a default beam corresponding to a first control resource set (CORESET) based on a specified rule, in which a maximum number of transmission configuration indication (TCI) states supported by the first CORESET is greater than or equal to 2.

In order to implement the above-mentioned embodiments, the present disclosure also provides a computer storage medium.

The computer storage medium provided in an embodiment of the present disclosure having stored therein executable programs that, when executed by a processor, cause the method for determining the default beam provided in any of the above-mentioned embodiments to be implemented, for example, as shown in at least one of FIGS. 1 to 6.

In order to implement the above-mentioned embodiments, the present disclosure also provides a computer program product. The computer program product includes a computer program that, when executed by a processor, causes the method for determining the default beam as described above to be implemented.

In order to implement the above-mentioned embodiment, the present disclosure also provides a computer program. The computer program, when executed by a processor, causes the method for determining the default beam as described above to be implemented.

Figure 9:
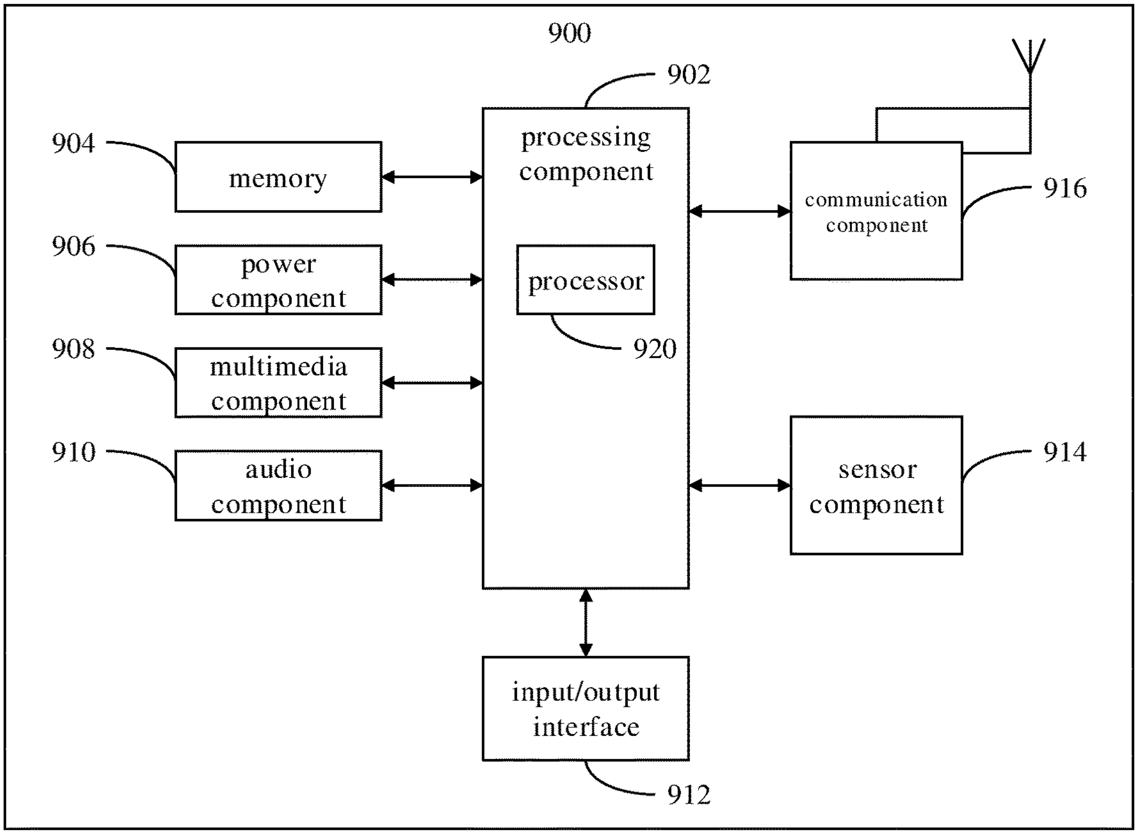
FIG. 9 is a block diagram of a user equipment provided in an embodiment of the present disclosure.

FIG. 9 is a block diagram of a UE (UE) 900 provided in an embodiment of the present disclosure. For example, the UE 900 may be a mobile phone, a computer, a digital broadcast UE, a messaging device, a game console, a tablet device, a medical device, a fitness device, a personal digital assistant, or the like.

Referring to FIG. 9, the UE 900 may include at least of the following components: a processing component 902, a memory 904, a power component 906, a multimedia component 908, an audio component 910, an input/output (I/O) interface 912, a sensor component 914, and a communication component 916.

The processing component 902 typically controls overall operations of the UE 900, such as the operations associated with display, phone calls, data communications, camera operations, and recording operations. The processing component 902 can include at least one processor 920 to execute instructions to perform all or some of the steps in the above-described methods. Moreover, the processing component 902 may include at least one module which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the UE 900. Examples of such data include instructions for any applications or methods operated on the UE 900, contact data, phonebook data, messages, pictures, videos, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the UE 900. The power component 906 may include a power management system, at least one power source, and any other components associated with the generation, management, and distribution of power in the UE 900.

The multimedia component 908 includes a screen providing an output interface between the UE 900 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake up time and a pressure associated with the touch or swipe action. In some embodiments, the multimedia component 908 includes a front camera and/or a rear camera. The front camera and/or the rear camera may receive an external multimedia datum while the UE 900 is in an operation mode, such as a photographing mode or a video mode. Each of the front camera and the rear camera may be a fixed optical lens system or have focus and optical zoom capability. The audio component 910 is configured to output and/or input audio signals. For example, the audio component 910 includes a microphone (MIC) configured to receive an external audio signal when the UE 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as keyboards, click wheels, buttons, and the like. The buttons may include, but are not limited to, a home button, a volume button, a starting button, and a locking button.

The sensor component 914 includes at least one sensor to provide status assessments of various aspects of the UE 900. For instance, the sensor component 914 may detect an open/closed status of the UE 900, relative positioning of components, e.g., the display and the keypad, of the UE 900, a change in position of the UE 900 or a component of the UE 900, a presence or absence of user contact with the UE 900, an orientation or an acceleration/deceleration of the UE 900, and a change in temperature of the UE 900. The sensor component 914 may include a proximity sensor configured to detect the presence of nearby objects without any physical contact. The sensor component 914 may further include a light sensor, such as a CMOS or CCD image sensor, for use in imaging applications. In some embodiments, the sensor component 914 may further include an accelerometer sensor, a gyroscope sensor, a magnetic sensor, a pressure sensor, or a temperature sensor.

The communication component 916 is configured to facilitate communication, wired or wireless, between the UE 900 and other devices. The UE 900 can access a wireless network based on a communication standard, such as WiFi, 2G, or 3G, or a combination thereof. In an illustrative embodiment, the communication component 916 receives a broadcast signal or broadcast associated information from an external broadcast management system via a broadcast channel. In an illustrative embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the UE 900 may be implemented with at least one application specific integrated circuit (ASIC), a digital signal processor (DSP), a digital signal processing device (DSPD), a programmable logic device (PLD), a field programmable gate array (FPGA), a controller, a micro-controller, a microprocessor, or other electronic elements, for performing the above-mentioned method.

In an illustrative embodiment, there is also provided a non-transitory computer readable storage medium including instructions, such as included in the memory 904, executable by the processor 920 in the UE 900, for completing the above-mentioned method. For example, the non-transitory computer-readable storage medium may be a ROM, a random access memory (RAM), a CD-ROM, a magnetic tape, a floppy disc, an optical data storage device, and the like.

Figure 10:
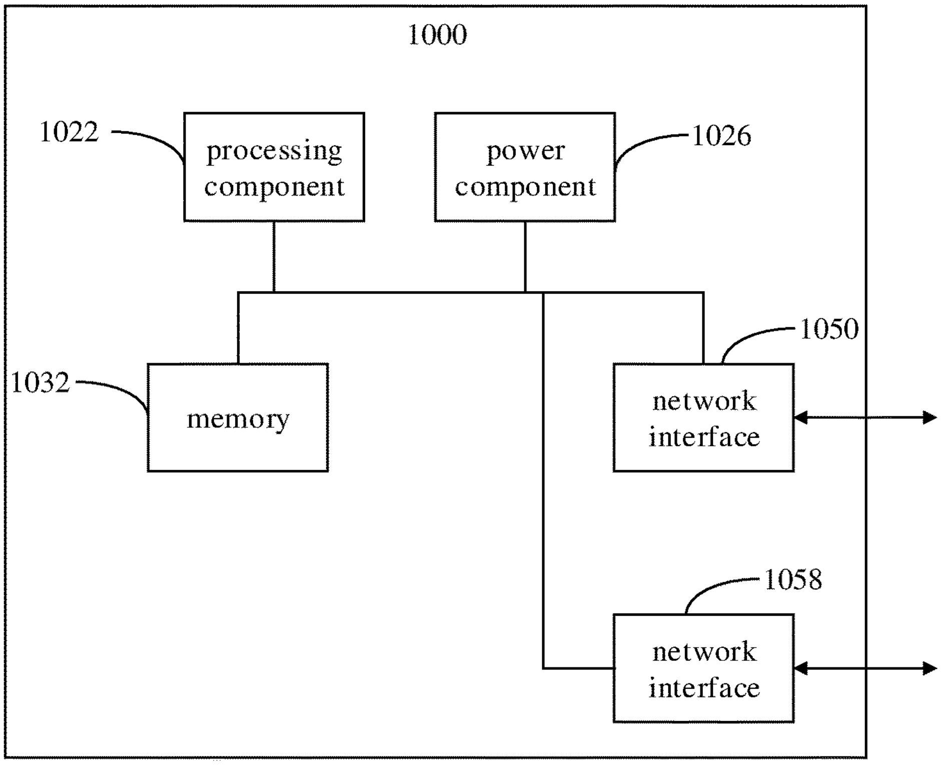
FIG. 10 is a schematic diagram illustrating a network device provided in an embodiment of the present disclosure.

As shown in FIG. 10, FIG. 10 is a schematic diagram illustrating a network device provided in an embodiment of the present disclosure. For example, the network device 1000 may be provided as a network device. Referring to FIG. 10, the network device 1000 includes a processing component 1022, which further includes at least one processor, and memory resources represented by a memory 1032 for storing instructions executable by the processing component 1022, such as an application program. The application program stored in the memory 1032 may include one or more modules each corresponding to a set of instructions. In addition, the processing component 1022 is configured to execute instructions to perform any of the above-mentioned methods performed by the network device, for example, the method shown in FIG. 6.

The network device 1000 may further include a power component 1026 configured to perform power management of the network device 1000, a wired or wireless network interface 1050 configured to connect the network device 1000 to a network, and an input/output (I/O) interface 1058. The network device 1000 may operate based on an operating system stored in the memory 1032, such as Windows Server™, Mac OS X™, Unix™, Linux™, FreeBSD™, or the like.

In the method for determining the default beam, the apparatus for determining the default beam, the user equipment, the network device, the system for determining the default beam, the computer-readable storage medium, the computer program product and the computer program provided in the embodiment of the present disclosure, the default beam corresponding to the first control resource set (CORESET) is determined based on the specified rule, in which the maximum number of transmission configuration indication (TCI) states supported by the first CORESET is greater than or equal to 2. Therefore, the default beam corresponding to the CORESET supporting the plurality of TCI states is determined by means of a predefined specified rule, thus improving the accuracy of determining the default beam for the CORESET corresponding to the plurality of TCI states, and increasing the reliability of multi-TRP data transmission.

Other embodiments of the disclosure will be apparent to those skilled in the art from consideration of the specification and practice of the disclosure disclosed here. The present disclosure is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a default beam, performed by a user equipment, comprising:

determining a default beam corresponding to a control resource set (CORESET), wherein the default beam comprises one or more transmission configuration indication (TCI) states supported by the CORESET, and the TCI states supported by the CORESET are configured for a transmission of a physical downlink control channel (PDCCH), and the default beam is configured for a transmission of a physical uplink shared channel (PUSCH) or reference signals;

wherein determining the default beam corresponding to the CORESET comprises:

receiving first downlink control information (DCI), wherein the first DCI is configured to indicate a second beam corresponding to the CORESET; and determining the second beam as the default beam corresponding to the CORESET;

wherein determining the second beam as the default beam corresponding to the CORESET comprises one of:

determining two second beams corresponding to a code point with a minimum value configured to indicate the two second beams in the first DCI as default beams corresponding to the CORESET; or determining one second beam corresponding to a specified TRP in two second beams as the default beam corresponding to the CORESET, the two second beams corresponding to a code point with a minimum value configured to indicate the two second beams in the first DCI.

2. The method of claim 1, wherein determining the default beam corresponding to the CORESET comprises:

receiving a medium access control control element (MAC CE), wherein the MAC CE is configured to activate a first beam corresponding to the CORESET; and determining the first beam as the default beam corresponding to the CORESET.

3. The method of claim 2, wherein a number of first beams is two, and determining the first beam as the default beam corresponding to the CORESET comprises:

the two first beams being determined as default beams corresponding to the CORESET; or one of the two first beams corresponding to a specified transmission and reception point (TRP) being determined as the default beam corresponding to the CORESET.

4. The method of claim 2, further comprising:

the MAC CE being a MAC CE indicating a dedicated beam of the CORESET.

5. The method of claim 1, wherein determining the default beam corresponding to the CORESET comprises:

determining a third beam corresponding to a CORESET with a minimum index value in a latest time unit during which a physical downlink control channel (PDCCH) is to be detected; and determining the third beam as the default beam.

6. The method of claim 1, further comprising:

receiving a configuration signaling sent by a network device, wherein the configuration signaling is configured to configure at least one CORESET, and one or more beams corresponding to each CORESET in the at least one CORESET, wherein the configuration signaling comprises at least one of a MAC CE or DCI.

7. The method of claim 1, further comprising:

transmitting at least one of data or reference signals corresponding to the CORESET based on the default beam corresponding to the CORESET.

8. The method of claim 7, wherein the data corresponding to the CORESET comprises at least one of:

data carried on a PDSCH; or data carried on a PUSCH.

9. A method for determining a default beam, performed by a network device, comprising:

determining a default beam corresponding to a control resource set (CORESET), wherein the default beam comprises one or more transmission configuration indication (TCI) states supported by the CORESET, and the TCI states supported by the CORESET are configured for a transmission of a physical downlink control channel (PDCCH), and the default beam is configured for a transmission of at least one of a physical uplink shared channel (PUSCH) or reference signals;

wherein determining the default beam corresponding to the CORESET comprises:

sending first downlink control information (DCI), wherein the first DCI is configured to indicate a second beam corresponding to the CORESET; and determining the second beam as the default beam corresponding to the CORESET;

wherein determining the second beam as the default beam corresponding to the CORESET comprises one of:

determining two second beams corresponding to a code point with a minimum value configured to indicate the two second beams in the first DCI as default beams corresponding to the CORESET; or determining one second beam corresponding to a specified TRP in two second beams as the default beam corresponding to the CORESET, the two second beams corresponding to a code point with a minimum value configured to indicate the two second beams in the first DCI.

10. The method of claim 9, wherein determining the default beam corresponding to the CORESET comprises:

sending a medium access control control element (MAC CE), wherein the MAC CE is configured to activate a first beam corresponding to the CORESET; and determining the first beam as the default beam corresponding to the CORESET.

11. The method of claim 9, further comprising:

sending a configuration signaling to a user equipment, wherein the configuration signaling is configured to configure at least one CORESET and one or more beams corresponding to each CORESET in the at least one CORESET.

12. A user equipment, comprising:

a transceiver;

a memory; and a processor connected to the transceiver and the memory, respectively, and configured to:

determine a default beam corresponding to a control resource set (CORESET), wherein the default beam comprises one or more transmission configuration indication (TCI) states supported by the CORESET, and the TCI states supported by the CORESET are configured for a transmission of a physical downlink control channel (PDCCH), and the default beam is configured for a transmission of at least one of a physical uplink shared channel (PUSCH) or reference signals;

wherein determining the default beam corresponding to the CORESET comprises:

receiving first downlink control information (DCI), wherein the first DCI is configured to indicate a second beam corresponding to the CORESET; and determining the second beam as the default beam corresponding to the CORESET:

wherein determining the second beam as the default beam corresponding to the CORESET comprises one of:

determining two second beams corresponding to a code point with a minimum value configured to indicate the two second beams in the first DCI as default beams corresponding to the CORESET; or determining one second beam corresponding to a specified TRP in two second beams as the default beam corresponding to the CORESET, the two second beams corresponding to a code point with a minimum value configured to indicate the two second beams in the first DCI.

13. The user equipment of claim 12, wherein the processor is further configured to:

receive a medium access control control element (MAC CE), wherein the MAC CE is configured to activate a first beam corresponding to the CORESET; and determine the first beam as the default beam corresponding to the CORESET.

14. The user equipment of claim 13, wherein a number of first beams is two, the two first beams are determined as default beams corresponding to the CORESET; or one of the two first beams corresponding to a specified transmission and reception point (TRP) is determined as the default beam corresponding to the CORESET.

15. A network device, comprising:

a transceiver;

a memory; and a processor connected to the transceiver and the memory, respectively, and configured to perform the method of claim 5.

16. A non-transitory computer storage medium having stored therein computer-executable instructions that, when executed by a processor, cause the processor to perform the method of claim 1.

17. A non-transitory computer storage medium having stored therein computer-executable instructions that, when executed by a processor, cause the processor to perform the method of claim 5.

* * * * *